Patented June 17, 1941

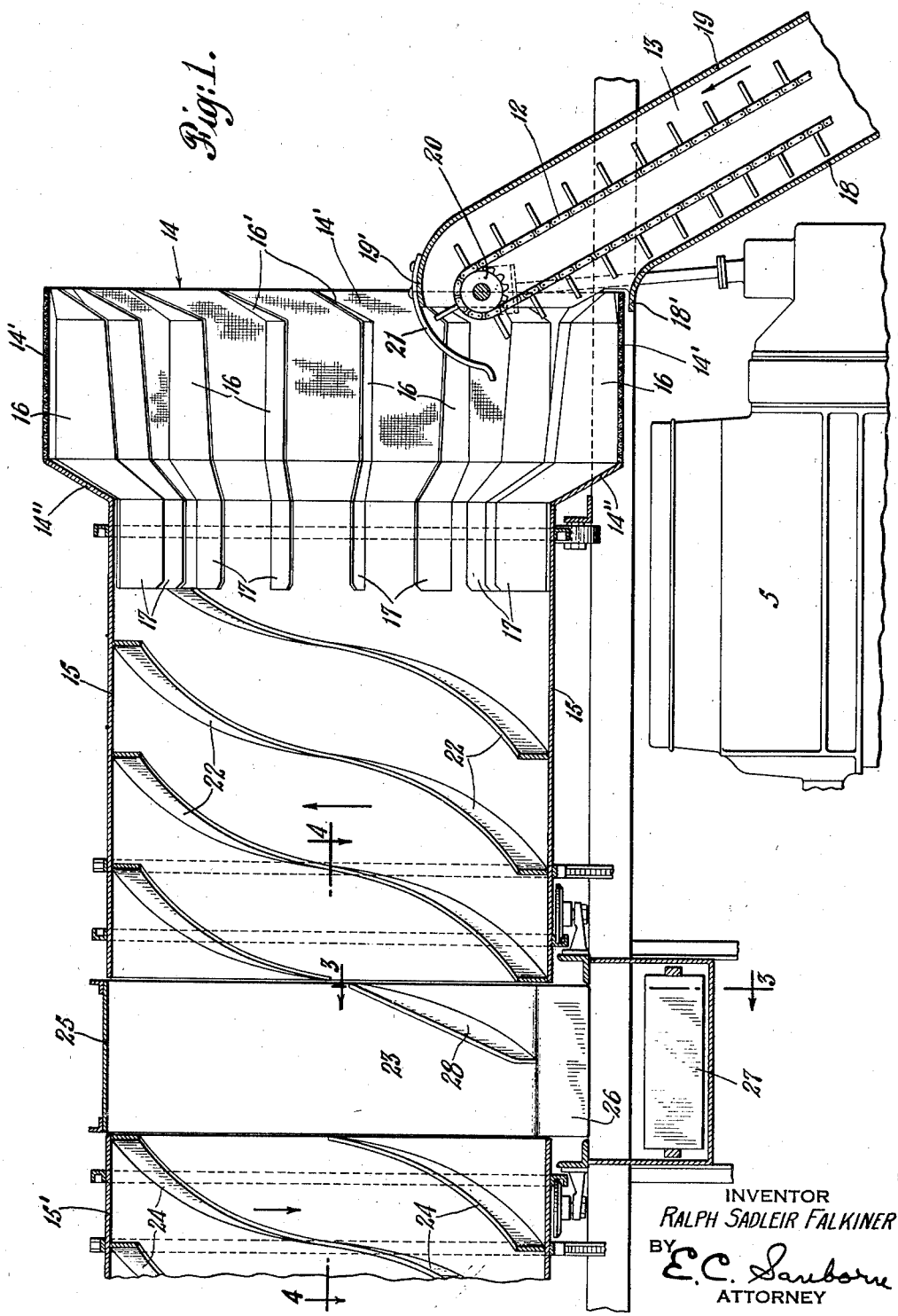

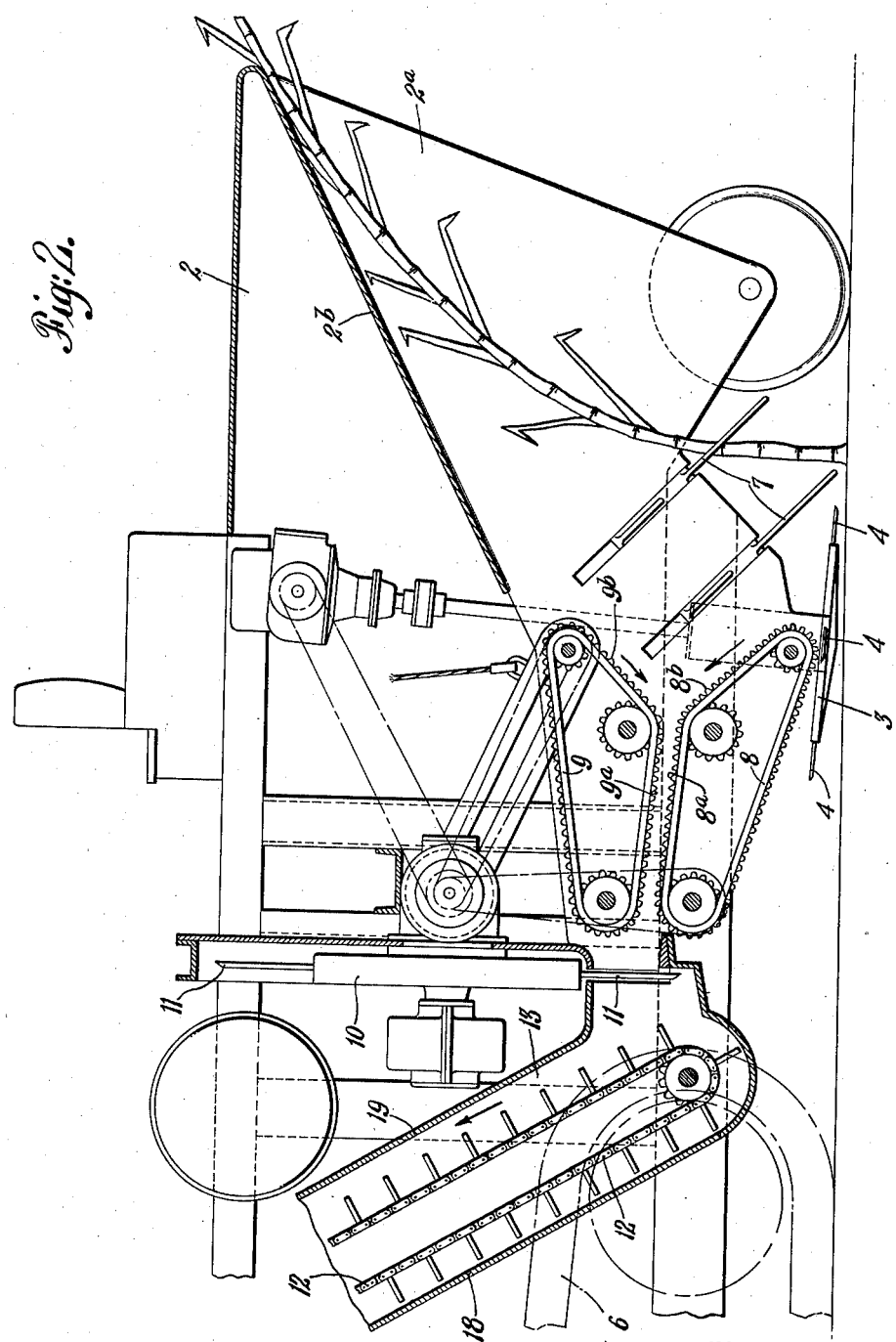

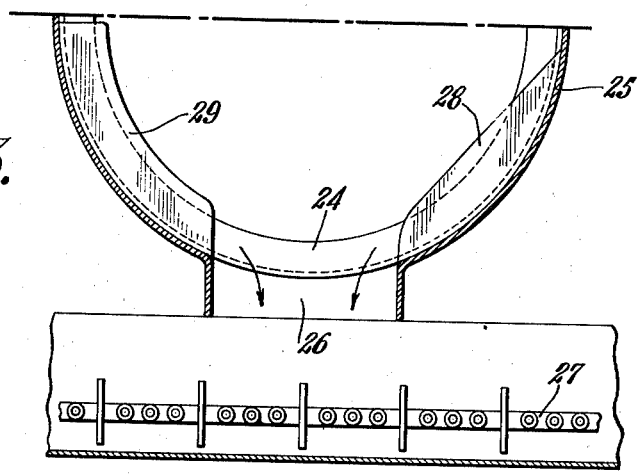
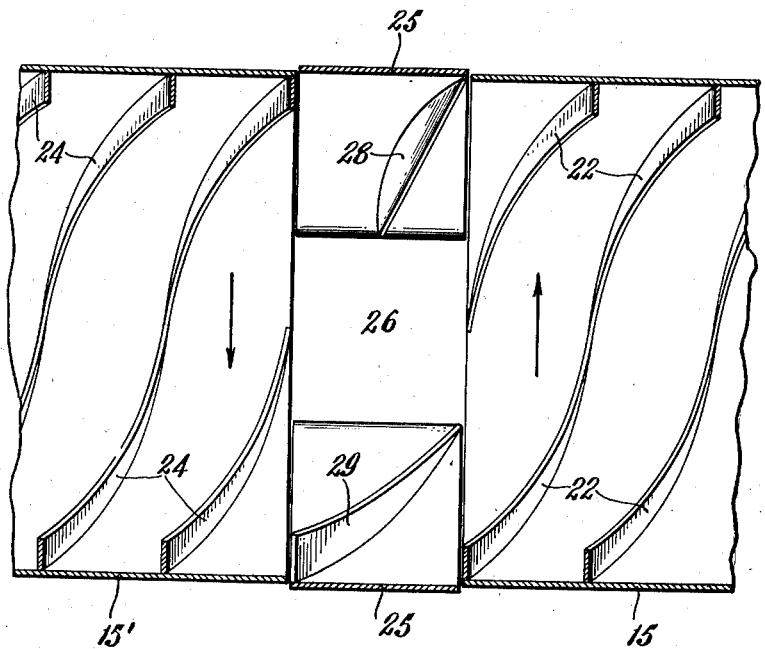

2,246,352

UNITED STATES PATENT OFFICE 2,246,352

CLEANING DRUM FOR CANE HARVESTING APPARATUS

Ralph Sadleir Falkiner, Melbourne, Australia, assignor, by mesne assignments, to United States Sugar Corporation, a corporation of Delaware Application April 5, 1938, Serial No. 200,085

10 Claims. (Cl. 209—21)

This invention relates to machines for harvesting sugar cane, and more particularly to improvements in machines of the type illustrated in the patent granted to Falkiner & Charley, No. 1,975,089, dated October 2, 1934, wherein the cane and attendant trash, after being severed from the ground, are conveyed to a chopping mechanism, and the chopped pieces are then transferred to the region of an air current induced by a suction fan where the cane is separated from the trash and is thence discharged at a suitable point.

One feature comprises means for insuring an even feed of the chopped cane and trash to the action of the air suction. The invention further comprises provisions for enabling the accomplishment of improved rapid and efficient separation of trash from the cane by an air suction. Another feature resides in means for enabling the pieces of clean cane to be fed to a discharge point with particular efficiency, despite the presence of a powerful air suction for effecting speedy separation of said pieces from the trash. In addition, the invention includes improved means for conveying cane and trash from the ground severing means to the chopping means. Other features and advantages of the invention will be hereinafter described and claimed.

In the accompanying drawings:

Fig. 1 is a side elevation, partly in section, of the front portion of a machine embodying my invention.

Fig. 2 is a side elevation, partly in section, of the forward portion of said machine.

Fig. 3 is a view in vertical section, taken on line 3—3 of Fig. 1.

Figure 4 is a horizontal sectional view on line 4—4 of Fig. 1.

Referring to Fig. 2 of the drawings, the forward end of the machine comprises a hood 2 having side portions 2a and a cross portion 2b joining the side portions near their tops and adapted to strike the cane to bend it over. Continuously rotating disks 3 (only one of which is shown) are adapted to travel on the ground and carry knives 4 which sever the cane. An engine 5 (Fig. 1) drives said disks through suitable connections and also drives caterpillar tracks 6 on which the machine is mounted. At either side and in front of the ground cutting means are sets of rotary pick-up fingers 7, which gather the severed cane and trash and carry the same inwardly to other parts of the machine. The elements above mentioned are disclosed in the Falkiner & Charley patent referred to above, to which reference may be made for a more specific description.

In the patent aforesaid there are disclosed a pair of conveyors 42, 43, comprising chains or belts having slats riveted or otherwise secured thereto. In the present embodiment these conveyors are supplanted by endless belts 8, 9, of rubber or other suitable flexible material having roughened treads. These belts may, for example, comprise layers of canvas and rubber vulcanized together, the outer layer of rubber being creased or roughened to provide saw-tooth treads or the like for gripping the mass of cane and trash delivered thereto by the pick-up fingers 7. There is thus avoided the provision of slats secured to endless chains or belts, which slats are subjected to excessive wear and strains and are susceptible to breakage and separation from the chains to which they are riveted and bolted. The creased or roughened rubber belts 8, 9 enable the trash and cane to be delivered speedily and efficiently to the chopper 10 without the possibility of breakage or severance of slats under the severe conditions at times encountered in service. It will be noted that the conveyors 8, 9, have working faces 8a, 9a which are parallel and with working faces 8b, 9b which preferably extend forwardly and make similar angles with working faces 8a and 9a, respectively, forming a jaw or throat for receiving the severed cane and trash from the gathering fingers 7. The upper conveyor 9 may be mounted for vertical displacement in the manner disclosed in the aforementioned patent.

The chopper 10, with blades 11, is the same as chopper 56, 57 disclosed in the above-mentioned patent, and may be driven in like manner. Similarly, the rubber conveyors 8, 9, may be mounted in the same way as the conveyors 42, 43 of said patent and may be driven in the same manner. The blades 11 chop the cane and trash received from the conveyors 8, 9 and deliver the chopped material to an elevator 12 in a housing 13.

The elevator 12 delivers the chopped cane and trash into the forward enlarged end 14 of a constantly rotating drum section 15. Said enlarged forward end 14 is composed of screening or netting 14' of steel or other suitable material. It will be noted that the elevator 12 extends at its upper end a substantial distance above the bottom of the drum portion 14 and discharges the chopped material above said bottom, so that said material is immediately subjected to the in-rush of the air suction passing up through the netting of said drum portion. The air suction is created by a fan (not shown) positioned at the rear of the drum section 15', as in the previously mentioned patent.

It will be noted that in the construction shown in the patent aforesaid the elevator 73 dropped the material directly on to the bottom of the forward extension of the drum, the slats of which then carried the cane and trash to the top and dropped it into the air current. In my present invention, however, owing to the front enlarged portion of the drum being composed of netting the trash and cane are dropped from the elevator 12 instantly into the air current at a convenient height, so that substantial quantities of trash are separated from the cane immediately, thus preventing congestion in the drum. The pieces of cane drop through the air current on to the bottom of the extension 14 and are thence carried upwardly by the slats 16, whence the cane and such trash as has not been removed are dropped through the air suction. Thereafter the cane and any trash still remaining are lifted and dropped through the air suction by slats or cleats 17 on the interior of the drum section 15. Since the trash (leaves, tops, and so forth) is lighter than the cane, a considerable portion thereof is removed by the air current passing up under it through the netting as soon as the material enters the forward end of the netting drum 14 and is sucked out through the fan at the rear open end of the drum section 15'. The combined effect of the air stream and the force feed of new material is to move the heavier material rearwardly in the drum 15. The repeated lifting and dropping of the heavier material through the air stream by the cleats 16 and 17 effects further removal of trash and dirt.

Dirt, sand, ash, or like extraneous material which drops through the netting 14' upon discharge from the elevator 12 and is promptly removed. The screening mesh may be quite coarse, one opening per inch, for example, it being sufficient that the mesh size be small enough to block passage of the pieces of cane but large enough to permit a large volume of air to enter, and dirt, sand, or particles of mud or the like to pass therethrough.

The slats 16 not only function to lift the material and drop it through the air current as above described but also serve effectively to stiffen and support the netting 14 and to maintain it rigidly in position. Said slats may be welded or otherwise suitably secured to the solid portion of the drum. They may, for example, be extended rearwardly into the drum 15 and welded or otherwise suitably secured thereto, or, as illustrated, they may be welded to the solid flared portion 14" of the drum.

The slats of the elevator 12 extend a sufficient distance toward the cover plate 19 of the housing 13 to insure the throwing of a continuous stream of material into the enlarged forward drum portion 14. It has been found that when the elevator or conveyor blades do not project sufficiently closely to said plate 19, the material collects at times between said blades and plate and interrupts the feed until the space is filled, whereupon the conveyor discharges the entire mass into the drum, with consequent congestion. The present arrangement insures an even continuous and rapid feed of material from the chopper to the drum. The elevator may conveniently be driven from the engine 5 by a chain passing over the sprocket wheel 20.

The cover 19 is extended, as shown at 19', in an arc concentric with the sprocket wheel 20, to form a hood above said wheel. Secured to said hood 19' and extending rearwardly and downwardly into the drum section 14 are a series of spring fingers 21. The latter intercept the material shot from the elevator 12, which in normal operation is driven at high speed, and direct said material downwardly into the section 14, preventing it from passing directly into the drum section 15 without first being elevated and dropped through the air stream by the vanes 16, except for the considerable portion of light material which is immediately removed by the current passing through the netting as previously described.

The lower apron 18 of the conveyor housing 13 is provided with a lip or extension 18' projecting below the bottom of the drum netting section 14 for receiving any pieces of cane that may at times escape from said drum. The conveyor slats thereupon return such pieces to the lower end of the conveyor whence they meet the flow of cane from the chopper and are returned to the drum therewith.

Positioned rearwardly of the blades 17 in the drum 15 are helical vanes or scrolls 22 which feed the clean pieces of cane rearwardly, without lifting them, to the discharge space 23 between the drums 15 and 15'. Drum 15' is also provided with helical scrolls or vanes 24 which are arranged to feed back to opening 23 any good cane which may have been carried past said opening into said drum. The drum sections 15, 15' are continuously rotated in opposite directions as in the patent hereinbefore referred to.

A stationary drum housing 25 surrounds the discharge space between the drums 15, 15' and extends closely adjacent the perimeters of said drums to form therewith a continuous path for the air stream. Said housing is open at its bottom, at 26, to permit the pieces of cane to pass on to a loading conveyor 27 as in the patent previously mentioned.

Secured in the fixed drum housing 25 is a baffle 28 which diverts the air stream from the pieces of cane being recovered by scrolls in the rear drum 15' and enables such pieces to drop to the discharge opening 26 without interference from the air stream. This baffle, as shown, is preferably stream lined. A fin 29 is also secured to said housing 25. This fin prevents cane fed by the scrolls 22 in the section 15 from passing into the rear section 15' and insures that cane fed by said scrolls will drop through the opening 26 instead of being sucked across the fixed housing 25 and into the rear drum.

The forward ends of the slats 16 are upturned as shown at 16' to provide baffle portions which aid in maintaining the material on said slats without appreciably interfering with the air current, these baffle portions 16' being similar to those designated 94 in the patent referred to hereinbefore.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a cane harvesting machine, a rotary drum for receiving cane and trash, means for inducing an air current through said drum, means for delivering cane and trash to a portion of said drum at a point substantially above the bottom thereof, said drum portion comprising screening means for enabling extraneous matter other than that carried by said air current to pass to the exterior of the drum, said screening means preventing passage of cane therethrough and providing for an upward flow of air under the action of said inducing means to the point of delivery of the cane and trash to said drum.

2. In a cane harvesting machine, a rotary drum for receiving cane and trash, means for inducing an air current through said drum, means for delivering cane and trash into said air current in the forward portion of said drum at a point substantially above the bottom thereof, means in said forward portion for elevating and dropping cane and trash through said current, and screening means in said forward portion for enabling extraneous matter other than that carried by said current to pass to the exterior of said drum, said screening means preventing passage of cane therethrough and providing for an upward flow of air under the action of said inducing means to the point at which cane and trash are delivered into said drum.

3. In a cane harvesting machine, a rotary drum for receiving cane and trash, means for inducing an air current through said drum, said drum having a forward portion of greater diameter than the main portion of said drum, means for introducing cane and trash into the air current in said forward portion of said drum at a point substantially above the bottom thereof, means in said drum for elevating cane and trash and dropping it through said current, and screening means in said forward portion for enabling extraneous matter passing through said current to pass to the exterior of said drum, said screening means preventing passage of cane therethrough and providing for an upward flow of air under the action of said inducing means to the point at which cane and trash are introduced into said drum.

4. In a cane harvesting machine, a rotary drum for receiving cane and trash, means for inducing an air current through said drum, said drum having a forward portion of greater diameter than the main portion of said drum, means for introducing cane and trash into the air current at a point substantially above the bottom of said forward portion to enable cane and other material to drop through said current and to enable said current to remove a portion of the trash upon introduction thereof into said forward portion, screening means in said forward portion for enabling an upward flow of air to the point of introduction of said cane and trash, said screening means preventing passage of cane therethrough, and means in said forward portion for elevating cane and other material and dropping it into said current.

5. A cane harvesting machine as defined by claim 4, wherein the main body portion of the drum is provided with means for elevating and dropping cane through the air current and with helical means for feeding cane rearwardly in said drum.

6. In a cane harvesting machine, a drum for receiving cane and trash, means for inducing an air current through said drum, means carried by said drum for elevating and dropping cane and trash through said air current and feeding cane through one end of said drum to a discharge point, a second drum positioned for receiving cane and trash carried by said air current from the first drum, said second drum being constructed and arranged to feed back to said discharge point cane carried by said air current from the first drum, and baffle means for preventing interference by said air current with the feeding of cane in said second drum, said baffle means being arranged adjacent the bottom of said drums and extending transversely of the direction of flow of the air and material in said drums.

7. In a cane harvesting machine, a drum for receiving cane and trash, means for inducing an air current through said drum, means carried by said drum for elevating and dropping cane and trash through said air current and feeding cane through one end of said drum to a discharge point, a second drum positioned for receiving cane and trash carried by said air current from the first drum, said second drum being constructed and arranged to feed back to said discharge point cane carried by said air current from the first drum, and means comprising a fin adjacent said discharge point for preventing cane fed by the first drum from passing into the second drum, said fin being located adjacent the bottom of said drums and extending transversely of the direction of flow of the air and material in said drums.

8. In a cane harvesting machine, a drum for receiving cane and trash, means for inducing an air current through said drum, means carried by said drum for elevating and dropping cane and trash through said air current and feeding cane through one end of said drum to a discharge point, a second drum positioned for receiving cane and trash carried by said air current from the first drum, said second drum being constructed and arranged to feed back to said discharge point cane carried by said air current from the first drum, and baffle means for preventing interference by said air current with the feeding back of cane in said second drum, and means comprising a fin adjacent said discharge point for preventing cane fed by the first drum from passing into the second drum, said baffle means and said fin being located adjacent the bottom of said drums and extending transversely of the direction of flow of the air and material in said drums.

9. In a cane harvesting machine, a drum for receiving cane and trash, means for inducing an air current through said drum, means carried by said drum for elevating and dropping cane and trash through said air current and feeding cane through one end of said drum, a second drum positioned for receiving cane and trash carried by said air current from the first drum, a housing positioned between said drums and provided with an opening in the bottom thereof for discharging cane received from the first drum, means in said second drum for feeding back to said opening cane carried by said air current from said first drum, and a baffle positioned in said housing at one side of said opening for preventing interference by said air current with the feeding of cane in said second drum, said baffle being located adjacent the bottom of said drums and extending transversely of the direction of flow of the air and material in said drums.

10. In a cane harvesting machine, a drum for receiving cane and trash, means for inducing an air current through said drum, means carried by said drum for elevating and dropping cane and trash through said air current and feeding cane through one end of said drum, a second drum positioned for receiving cane and trash carried by said air current from the first drum, a housing positioned between said drums and provided with an opening in the bottom thereof for discharging cane received from the first drum, means in said second drum for feeding back to said opening cane carried by said air current from said first drum, and a baffle positioned in said housing at one side of said opening for preventing interference by said air current with the feeding of cane in said second drum, and a fin positioned on the opposite side of said opening for preventing cane fed by the first drum from passing into said second drum, said baffle and said fin being located adjacent the bottom of said drums and extending transversely of the direction of flow of the air and material in said drums.

RALPH SADLEIR FALKINER.